June 5, 1962 E. J. GRENCHUS 3,038,147

DATA SELECTING APPARATUS

Filed Dec. 31, 1958 2 Sheets-Sheet 1

INVENTOR
EDWARD J. GRENCHUS

BY John P. Dority
ATTORNEY

June 5, 1962 E. J. GRENCHUS 3,038,147

DATA SELECTING APPARATUS

Filed Dec. 31, 1958 2 Sheets-Sheet 2

United States Patent Office 3,038,147

Patented June 5, 1962

3,038,147

DATA SELECTING APPARATUS

Edward J. Grenchus, Johnson City, N.Y., assignor to International Business Machines Corporation, New York, N.Y., a corporation of New York

Filed Dec. 31, 1958, Ser. No. 784,267

6 Claims. (Cl. 340—174)

This invention relates to data processing machines and relates in particular to apparatus for controlling and selecting information from storage devices associated with such machines.

In data storage apparatus such as magnetic core arrays, it is often desirable to read out only particular fields or words within the storage array. It is further desirable that a machine be selectively controllable by an operator to read out a field of any selected length, that is, a field of any given number of characters. Accordingly, an object of this invention is to provide an improved means for controlling the selection of characters to be read out of a storage device.

According to a preferred embodiment of this invention a magnetic core storage array is provided with an auxiliary plane of magnetic cores for the purpose of selectively controlling the information read out of the array. Each core of the auxiliary plane of cores may be provided with a control hub into which may be plugged a wire carrying a current to prevent the particular core plugged thereto from reversing its state of magnetization under the influence of driving circuits. A bistable device is provided that is changed from the one state to the opposite state upon the scanning of each core having a wire plugged thereto. The bistable device in one state allows information from the core array to pass through a switch and in its opposite state effects the closing of the switch so that the information from the array does not pass through. Thus, with the beginning of a field of the core array marked by a control wire and the end of the field marked by a control wire, the trigger is caused to reverse its state at the beginning of the field selected and at the end of the field to allow only the selected data to pass through the switch and be transmitted to any desirable utilization device.

Accordingly another object of this invention is to provide improved control means for controlling the data read out of a magnetic core storage array.

Another object of this invention is to provide a more economical means for controlling the data read out of a storage array.

Another object is to provide a simplified means for controlling the data read out of a storage device.

Another object of this invention is to provide a simplified control mechanism for selecting the information read out of a storage array with the use of a small number of control wires.

Still another object of this invention is to provide improved means associated directly with a core storage array for selection of the data to be read out of the core storage array.

A still further object of this invention is to provide improved and simplified control wire operated mechanism for selecting the data to be read from a magnetic core storage array.

Other objects of the invention will be pointed out in the following description and claims and illustrated in the accompanying drawings, which disclose, by way of examples, the principle of the invention and the best mode, which has been contemplated, of applying that principle.

Figure 1:
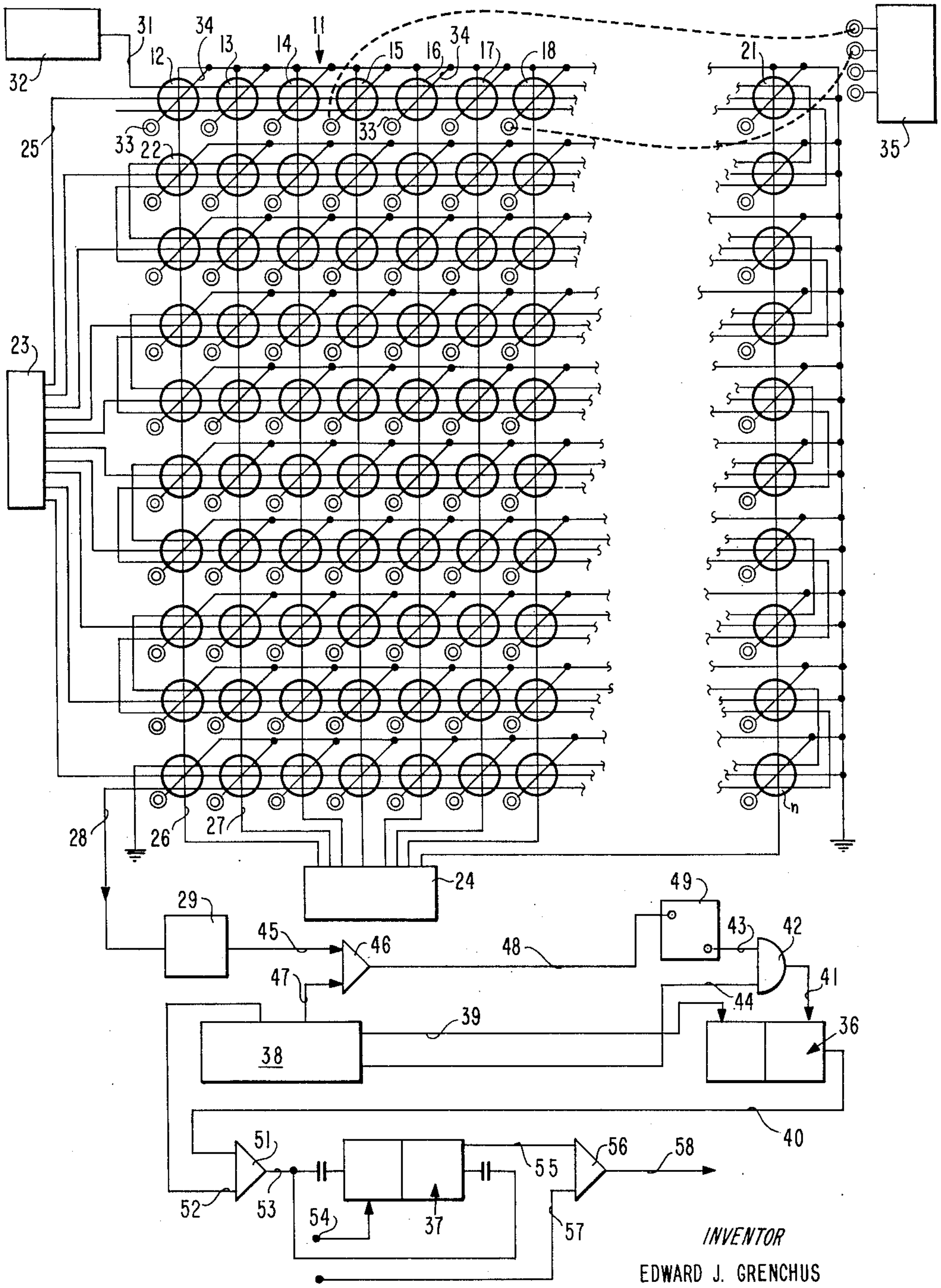
FIG. 1 is a schematic diagram of a preferred embodiment of the present invention.

Referring to FIG. 1, a magnetic core array 11 is shown comprised of a plurality of cores arranged in rows and columns. The cores in row 1 are labeled 12 through 21 and as many such rows as desired may be utilized. Only the auxiliary plane of cores is shown in FIG. 1. However, it may be assumed that lying directly underneath the auxiliary plane of cores are other planes of cores for storing data. If, for example, data is stored in a two out of five code, there are provided five planes of data storage cores, each plane being driven by a common set of drivers. The common set of drivers is shown at 23 and 24 and is also common to the auxiliary plane. To store a character in the storage array, one core of each of the five data planes is utilized. Two of these five cores will contain a "bit" to represent the character. For example, if the position at 12 were to have a character stored therein, five additional cores other than the one shown and labeled 12 would be provided and two of these cores would be placed in a particular state of remnant magnetization to represent the particular character stored. Each plane is provided with a sense winding such that the bits of a character read out appear simultaneously on the five sense lines. Core arrays of this type are well known. The provision of the additional plane and the circuitry associated therewith form the preferred embodiment of applicant's invention.

The auxiliary core array is sequentially driven or scanned by the common coordinate driving means 23 and 24. These coordinate driving means are of a type well known in the art and perform the function of selecting the individual characters of the array by the simultaneous application of currents through a wire from each of the drivers. For example, if it is desired to select the auxiliary core 12 and the storage cores associated therewith, lines 25 and 26 are simultaneously energized by the drivers 23 and 24. If it is desired to select the core 13, the lines 25 and 27 are simultaneously energized by the drivers 23 and 24. Any core in the array may be selected in a like manner. The driving circuits normally provided for driving the core storage array are also used to drive the auxiliary core array or plane, thus, no additional driving means are required for supplying the auxiliary array. Each of the drivers 23 and 24 supplies one-half the current required to reverse the state of a magnetic core and, thus, the application of current through a core on the two wires from the driving means effects the selection or reversal of state of that particular core. In this manner of operating a core array, a common sense line is provided for each plane. The auxiliary plane, shown in FIG. 1, is provided with a common sense line 28 that threads all the cores of this auxiliary plane and is connected to an amplifying and shaping means 29. Each plane of the storage array is provided with a sense line similar to line 28. In addition to the sense winding threading each of the cores of the auxiliary plane, a reset winding 31 threads each of the cores of the plane. This reset winding is supplied with current by a driver 32 when it is desired to reset the entire auxiliary core plane. The driver 32 may be of any well known type current supply commonly used for this purpose. The driver 32 supplies current through line 31 to induce flux in the cores in the opposite direction to that induced by the coordinate drivers. In addition to the above mentioned usual windings provided for a plane of a core array, the auxiliary plane of core array 11 is provided with a plug hub 33 and a winding 34 for each of the cores of the auxiliary plane. A source of current 35 is provided having hub exits, such that a control wire may be plugged from an exit of the source 35 to any of the hubs 33 associated with the auxiliary core plane. When a control wire is plugged from the source 35 to the hub 33 of a particular core, a current is supplied from ground through the winding or wire 34 threading the core and to the source 35 such that the normal driving currents supplied by the sources 23 and 24 are counteracted. A core having a control wire from source 35 supplied thereto will not reverse its state in response to the coordinate selection by drivers 23 and 24. Thus, when the auxiliary core plane is scanned by the drivers 23 and 24, all the cores in the auxiliary array except those having a control wire connected thereto will have their state of magnetization reversed to produce a signal on the sense winding 28. When, however, a core having a control wire connected thereto from source 35 is scanned, there will be no signal produced on sense line 28.

Figure 2:
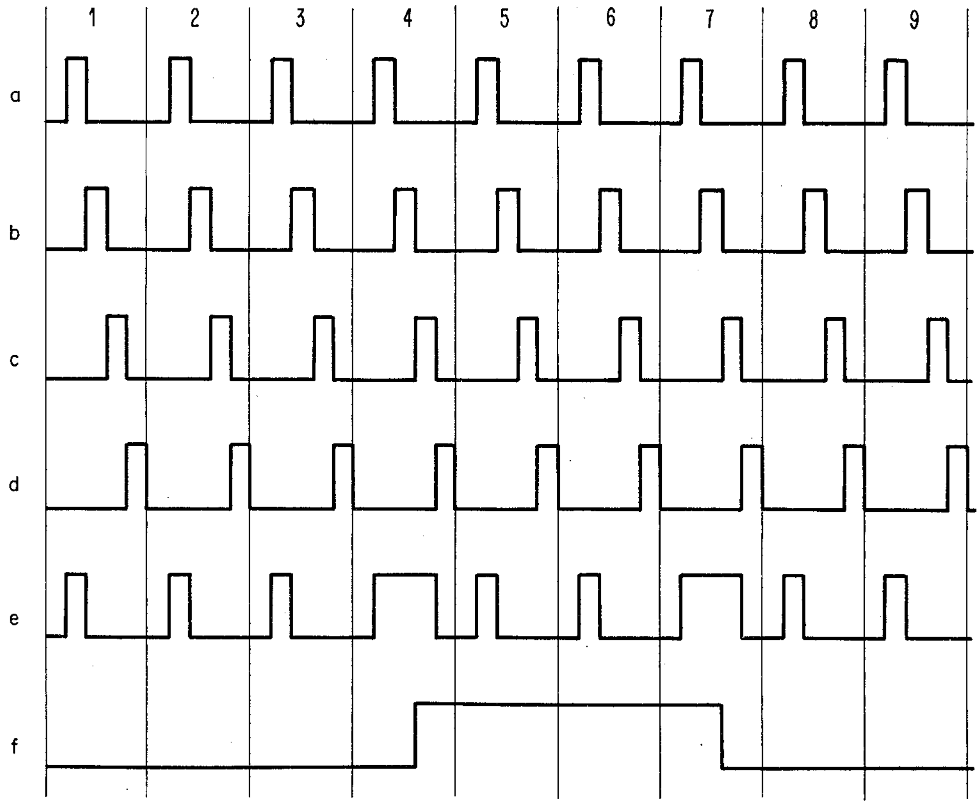
FIG. 2 shows diagrammatic waveforms to the common time base of several of the signals utilized in the apparatus of FIG. 1.

A trigger circuit 36 constructed in any well known manner is provided to be acted upon by signals appearing on sense line 28. The output of this trigger circuit 36 is taken on line 40 from the plate, for example, of one of the two tubes constituting the trigger circuit. A source of timing pulses 38 is provided and supplies the pulses labeled *a*, *b*, *c* and *d* in FIG. 2. The source of timing pulses 38 may be constructed in any well known manner, and supplies the timing pulse shown at *a* in FIG. 2 over line 39 to set trigger 36. When trigger 36 is set it will be assumed that the line 40 has a positive potential applied thereto. When trigger 36 is reset, it will be assumed that line 40 has no potential applied thereto. These potentials are of course arbitrarily so assumed while in practice the potentials would be of one level for the reset condition and a higher level for the set condition. Thus, as each pulse shown at *a* in FIG. 2 occurs, the trigger 36 will be set to supply a positive going potential to line 40. Trigger 36 is reset by the line 41 from OR circuit 42. OR circuit 42 is constructed in the well known manner and is a circuit that will supply a signal to line 41 when either input line 43 or line 44 has a signal thereon or when both lines have signals thereon. The output of the auxiliary plane of the core array is supplied over line 28 to amplifier and shaper circuit 29, which amplifier and shaper circuit may be constructed in any well known manner. When a signal is supplied to circuit 29 over line 28, circuit 29 produces an output on line 45 to AND circuit 46. AND circuit 46 is constructed in the well known manner and requires that both inputs 45 and 47 be active or have coincident signals thereon to produce an output signal on line 48. When coincidence of signals occurs on lines 45 and 47, an output is produced on line 48 and supplied to amplifier 49 where the pulse is amplified and supplied to line 43 and thus through the OR circuit 42 to line 41 to reset trigger 36. A sample pulse is supplied from pulse generator 38 to line 47 at the time shown at *b* in FIG. 2. Thus, if an output signal appears on sense line 28 from the auxiliary core plane at character time 1 as indicated in FIG. 2, trigger 36 will be set a time *a* and reset at the time indicated at *b* in FIG. 2 in response to this output signal and the coincidence of a signal from pulse source 38. The output of trigger 36 is supplied on line 40 to one side of an AND circuit 51. AND circuit 51 has on its other input 52 a pulse or signal supplied from the pulse generator 38. The signals supplied on line 52 from pulse generator 38 are shown at *c* in FIG. 2. Thus, if a signal appears on sense line 28 the trigger 36 is reset before the pulse appears on line 52 and thus no signal is produced at the output of AND circuit 51. If however, a control wire is plugged into the particular core being scanned in the auxiliary core plane, no signal is applied over line 28 to the amplifier and shaper 29 and thus no signal appears on line 45 to AND circuit 46, no signal appears on output 48 to amplifier 49, and no signal is produced at the output of OR circuit 42 at the time shown at *b* in FIG. 2. Thus, the trigger 36 remains set at the time that the pulse shown at *c* in FIG. 2 is applied over line 52 to AND circuit 51. With trigger 36 set, a positive voltage is supplied over line 40 to AND circuit 51 and at the time *c* shown in FIG. 2 a signal is produced at the output of AND circuit 51 and supplied over line 53 to a bistable device or trigger 37. The line 53 is capacitively coupled to both sides of trigger 37. Trigger 37 is of the well known type in which the trigger will reverse states of conduction in response to a signal simultaneously applied to the control electrodes of the two sides. Assuming that trigger 37 is reset as a result of the application of a pulse to terminal 54 prior to the initiation of scanning of the core array by drivers 23 and 24, then the trigger 37 is set in response to the control wire plugged into one of the cores preventing a signal on line 28. A negative signal applied at terminal 54 may be applied in the well known manner to the control electrode of the left hand side of trigger 37 to reset this trigger to the state where the right hand side is conducting and the potential on line 55 is at the low level. When the signal from line 53 sets trigger 37, the output from trigger 37 taken on line 55 is supplied to a switch or AND circuit 56. The other side of AND circuit 56 has the information from the core array fed thereto on line 57. Line 57 is representative of the five sense lines from the storage array using the two out of five code, for example. In the case of a two out of five code array, there are five AND circuits 56 and five sense lines 57 feeding these five AND circuits. The line 55 is commoned to all the AND circuits 56 supplying the information from the storage array to line 58. Trigger 37 will remain set until another pulse is applied over line 53 or until a reset pulse is supplied on terminal 54. Since the resetting of trigger 37 by terminal 54 will not take place during the scan of the core array, this need not be considered hereafter in the operation of the circuit. However, in the operation of the machine incorporating the array of FIG. 1, the trigger 37 may be reset at the beginning of an operation by reset driving source 32. It should be assumed that the information appearing on line 57 has been sampled in each character time during the times shown at *c* or *d* in FIG. 2. This may be accomplished by well known sampling means such as AND circuits at the output of the core planes supplied on one side by amplified signals from the sense lines and on the other side by pulses from source 38 shown, for example, at *d* in FIG. 2.

Let it be assumed that it is required to read out only the information contained in positions indicated at 15 through 17 in FIG. 1 of the core array. That is, the data contained in the field of cores lying underneath auxiliary cores 15, 16 and 17 only is to be read out on line 58. All that is necessary on the part of the operator to accomplish this is that a control wire be plugged into the terminal 33 associated with core 15 and a control wire be plugged into the terminal 33 associated with core 18. With this arrangement, when the scanning means or drivers 23 and 24 select cores 15 and 18, a pulse from the auxiliary core plane will not appear at these times on line 28. Thus, with trigger 36 in the set condition at the time shown at *a* in FIG. 2 as core 15 is being scanned, the trigger 36 will not be reset at the time shown at *b* since no pulse appears on line 28. Trigger 36 will remain on until after the pulse on line 52 at *c* time of FIG. 2 occurs. Thus, trigger 36 will supply a positive potential to AND circuit 51 and allow the pulse on line 52 at time *c* to pass through AND circuit 51 and flip trigger 37 to the set state or condition. Trigger 37 will remain in this condition and allow information from line 57 to pass through AND circuit 56. Trigger 37 will remain in the set state until reset by a second pulse supplied on line 53. As the drivers scan cores 16 and 17, no change in the state of trigger 37 is effected since trigger 36 is reset at each of these times at the time indicated at *b* in FIG. 2. No signal is allowed to pass from line 52 through AND circuit 51 since trigger 36 is reset at each of these scans as the signal at time *c* of FIG. 2 appears. However, when the drivers scan position 18, trigger 36 is not reset at *b* time, but is in its set condition and allows the pulse at *c* time to pass from line 52 through AND circuit 51 to line 53 to reverse the state of trigger 37 and thus close the switch or AND circuit 56 and terminate the passage of data from line 57 to the output line 58. Line 58 supplies appropriate data utilization means. It should be noted that when trigger 36 is not reset by a pulse from sense line 28, the trigger is reset by a signal on line 44 at the other side of the OR circuit 42. Pulse generator 38 supplies a pulse over line 44 as shown at *d* in FIG. 2 such that trigger 36 is reset for each character time after the occurrence of the signal on line 52 shown as *c* in FIG. 2.

The set time of trigger 36 is shown at *e* in FIG. 2. The set time of trigger 37 is shown at *f* in FIG. 2.

From the above it may be observed that with two wires plugged into the auxiliary core plane, a single field of any desired number of characters may be selected to be read out. It will be obvious that the provision of four control wires enables two fields of any desired length to be selected and read out.

As an alternate to the preferred embodiment just described, the core plane might be operated in a different manner. Instead of resetting all the cores to the state above described, they might be reset to the opposite state. The control wire would then set the selected cores such that the coordinate drivers would reset the selected cores to produce a signal on the sense line 28. The sense line signal would then operate the trigger 37 directly. The trigger 36 would not then be needed since trigger 36 serves the function of allowing trigger 37 to be flipped each time a pulse is absent on line 28.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for selectively gating data out of a serially operating storage device comprising, in combination, a magnetic core storage array, means for sequentially scanning said array simultaneously with the scan of said storage device, winding means on each of said cores, means responsive to the scanning of each selected core for producing a signal, means for supplying current through the winding means of selected ones of said cores for preventing said cores from changing states in response to said signal, a switch for receiving data from said storage device, a bistable device operable in a first state to control said switch to pass data from said storage device and operable in a second state to control said switch to block data from said storage device, and means responsive to each signal produced for reversing the state of said bistable device.

2. Apparatus for selectively gating data out of a magnetic core storage array comprising an auxiliary plane of magnetic core switching elements, means for sequentially scanning said auxiliary plane of switching elements simultaneously with the scan of said storage array, winding means on each of the cores of said auxiliary plane, means responsive to the scanning of each selected core of said auxiliary plane for producing a signal, means for supplying current through the winding means of selected ones of said cores of said auxiliary plane to block the production of a signal by said selected cores, a switch for receiving data from said storage array, a bistable device operable in a first state to control said switch to pass data and operable in a second opposite state to control said switch to block data from said storage array, means responsive to each signal produced for reversing the state of said bistable device, and said selected cores determining the extent of the core field from which signals are received.

3. Apparatus for selectively gating data out of a magnetic core storage array comprising an auxiliary core storage array comprising an auxiliary plane of magnetic core switching elements, means for sequentially scanning the cores of said auxiliary plane of switching elements to produce a signal from each core scanned simultaneously with the scan of said storage array, winding means on each of the cores of said auxiliary plane, means for supplying currents through the winding means of selected ones of said cores of said auxiliary plane to block the production of a signal therefrom, a switch for receiving data from said storage array, a bistable device operable in a first state to control said switch to pass data and operable in a second opposite state to control said switch to block data from said storage array, and control means responsive in the absence of a signal from a core scanned in said auxiliary plane for reversing the state of said bistable device.

4. Apparatus according to claim 3 wherein said means for supplying current comprise control wires selectively pluggable by an operator.

5. Apparatus according to claim 3 wherein said control means comprise a second bistable device and means responsive to signals from said auxiliary plane to reverse the state of said second bistable device to block the reversal of said first-mentioned bistable device.

6. Apparatus according to claim 5 wherein said second bistable device is provided with means for reversing the state thereof upon the scan of each core of said auxiliary plane.

References Cited in the file of this patent

UNITED STATES PATENTS

| | | |
|---|---|---|
| 2,802,203 | Stuart-Williams | Aug. 6, 1957 |
| 2,902,678 | Kosonocky | Sept. 1, 1959 |
| 2,933,720 | Newhouse et al. | Apr. 19, 1960 |
| 2,956,271 | Keller | Oct. 11, 1960 |